United States Patent
Crump

(10) Patent No.: US 10,215,296 B2
(45) Date of Patent: Feb. 26, 2019

(54) PRESSURE RELIEF VALVE TUNING FEATURE

(71) Applicant: BorgWarner Inc., Auburn Hills, MI (US)

(72) Inventor: Matthew W. Crump, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 164 days.

(21) Appl. No.: 15/501,653

(22) PCT Filed: Jul. 27, 2015

(86) PCT No.: PCT/US2015/042170
§ 371 (c)(1),
(2) Date: Feb. 3, 2017

(87) PCT Pub. No.: WO2016/025150
PCT Pub. Date: Feb. 18, 2016

(65) Prior Publication Data
US 2017/0227135 A1    Aug. 10, 2017

Related U.S. Application Data

(60) Provisional application No. 62/035,414, filed on Aug. 9, 2014.

(51) Int. Cl.
*F16H 7/08* (2006.01)
*F16H 7/22* (2006.01)
(Continued)

(52) U.S. Cl.
CPC ............ *F16K 17/06* (2013.01); *F16H 7/08* (2013.01); *F16H 7/0848* (2013.01); *F16H 7/22* (2013.01);
(Continued)

(58) Field of Classification Search
CPC ..... F16H 2007/0806; F16H 2007/0859; F16H 2007/0812; F16H 2007/0814; F16H 7/0848
(Continued)

(56) References Cited

U.S. PATENT DOCUMENTS 4,504,251 A * 3/1985 Mittermeier .......... F16H 7/0836
474/110
5,700,213 A * 12/1997 Simpson ............... F16H 7/0848
474/110
(Continued)

FOREIGN PATENT DOCUMENTS

CN    200942695 Y    9/2007
CN    201593532 U    9/2010

OTHER PUBLICATIONS

International Search Report for Application No. PCT/US2015/042170 dated Oct. 15, 2015, 3 pages.
(Continued)

*Primary Examiner* — Henry Y Liu
(74) *Attorney, Agent, or Firm* — Howard & Howard Attorneys PLLC

(57) ABSTRACT

A pressure relief valve (10) in a hydraulic tensioner for an endless loop power transmission member and method of assembly can include a check valve member (18) positioned within a fluid passage (14) defined by a housing (12) for movement toward and away from a valve seat (16) defined by the housing (12), a spring (20) normally biasing the check valve member (18) toward the valve seat (16), and a spring retainer (22) assembled within the fluid passage (14) to a variable depth in response to feedback pressure for automatically adjusting a biasing force of the assembled spring (20) to compensate for tolerances effecting a relief pressure value of an assembled pressure relief valve and allowing control of the relief pressure value to be within a predeter-
(Continued)

mined range with respect to a predetermined target relief pressure value for driving the check valve member (18) away from the valve seat (16).

15 Claims, 4 Drawing Sheets

(51) Int. Cl.
  *F16K 15/02* (2006.01)
  *F16K 15/04* (2006.01)
  *F16K 17/04* (2006.01)
  *F16K 17/06* (2006.01)
  *F16K 37/00* (2006.01)

(52) U.S. Cl.
  CPC .......... *F16K 15/021* (2013.01); *F16K 15/026* (2013.01); *F16K 15/044* (2013.01); *F16K 17/04* (2013.01); *F16K 37/005* (2013.01); *F16H 2007/0814* (2013.01); *F16H 2007/0859* (2013.01)

(58) Field of Classification Search
  USPC .......................................................... 474/110
  See application file for complete search history.

(56) References Cited

U.S. PATENT DOCUMENTS

| | | | | |
|---|---|---|---|---|
| 5,707,309 | A * | 1/1998 | Simpson | F16H 7/08 474/110 |
| 6,361,458 | B1 * | 3/2002 | Smith | F16H 7/0848 474/109 |
| 6,729,986 | B2 * | 5/2004 | Kurohata | F16H 7/0848 474/110 |
| 6,810,907 | B2 | 11/2004 | Hashimoto et al. | |
| 7,618,339 | B2 * | 11/2009 | Hashimoto | F01L 1/02 474/109 |
| 8,197,369 | B2 * | 6/2012 | Mishima | F16H 7/0848 474/110 |
| 8,574,107 | B2 * | 11/2013 | Nakano | F16H 7/0836 474/110 |
| 2002/0052259 | A1 * | 5/2002 | Nakakubo | F16H 7/0848 474/109 |
| 2002/0065159 | A1 * | 5/2002 | Markley | F16H 7/0848 474/110 |
| 2003/0070717 | A1 * | 4/2003 | Hashimoto | F16H 7/0848 137/825 |
| 2003/0166428 | A1 * | 9/2003 | Beardmore | F01L 1/02 474/110 |
| 2003/0195070 | A1 | 10/2003 | Beardmore | |
| 2007/0032322 | A1 * | 2/2007 | Beardmore | F16H 7/0848 474/110 |
| 2007/0270259 | A1 * | 11/2007 | Koch | F16H 7/0848 474/110 |
| 2008/0015069 | A1 * | 1/2008 | Kroon | F16H 7/0836 474/110 |
| 2008/0064546 | A1 * | 3/2008 | Ullein | F16H 7/0848 474/110 |
| 2008/0289703 | A1 * | 11/2008 | Penzone, Jr. | F16H 7/0848 137/539 |
| 2009/0170647 | A1 * | 7/2009 | Mishima | F16H 7/0848 474/110 |
| 2009/0197722 | A1 * | 8/2009 | Emizu | F16H 7/0836 474/110 |
| 2010/0004080 | A1 * | 1/2010 | He | F16K 17/0406 474/110 |
| 2010/0093474 | A1 * | 4/2010 | Onimaru | F16H 7/0848 474/110 |
| 2011/0237370 | A1 * | 9/2011 | Hartmann | F16H 7/0836 474/110 |
| 2011/0256970 | A1 * | 10/2011 | Nakano | F16H 7/0836 474/110 |
| 2011/0263366 | A1 * | 10/2011 | Botez | F16H 7/0848 474/110 |
| 2013/0017913 | A1 * | 1/2013 | Hartmann | F16H 7/0848 474/110 |
| 2014/0187367 | A1 * | 7/2014 | Todd | F16H 7/08 474/110 |
| 2016/0290447 | A1 * | 10/2016 | Kunimatsu | F16H 7/0848 |
| 2016/0327135 | A1 * | 11/2016 | Fischer | F16H 7/0836 |
| 2016/0356365 | A1 * | 12/2016 | Crump | F16H 7/0848 |
| 2017/0037939 | A1 * | 2/2017 | Kunimatsu | F16H 7/0836 |
| 2017/0130807 | A1 * | 5/2017 | Kurematsu | F16H 7/0848 |
| 2017/0138444 | A1 * | 5/2017 | Kurematsu | F16H 7/0848 |

OTHER PUBLICATIONS

English language abstract and machine-assisted English translation for CN 200942695 extracted from espacenet.com database on Sep. 24, 2018, 7 pages.

English language abstract and machine-assisted English translation for CN 201593532 extracted from espacenet.com database on Sep. 24, 2018, 8 pages.

* cited by examiner

PRESSURE RELIEF VALVE TUNING FEATURE

CROSS-REFERENCE TO RELATED APPLICATIONS

This application is the National Stage of International Patent Application No. PCT/US2015/042170, filed on Jul. 27, 2015, which claims priority to and all the advantages of U.S. Provisional Patent Application No. 62/035,414, filed on Aug. 9, 2014, the content of which is incorporated herein by reference.

FIELD OF THE INVENTION

The invention relates to a hydraulic tensioner having a pressure relief valve for reducing maximum loads experienced by the timing chain.

BACKGROUND

Hydraulic tensioners can typically be used on a slack slide of a flexible endless loop power transfer chain to compensate for elongation of the chain during use in order to maintain a desired tension on the chain. Hydraulic tensioners generally include a housing and a piston slidably received in a piston bore formed in the housing. Oil pressure is supplied to a hydraulic chamber defined by inner wall surfaces of the piston bore. When the tension in the chain increases and the chain imparts an increased force to the piston, oil pressure in the hydraulic chamber increases, requiring a pressure relief valve for improving the performance of the hydraulic tensioner to prevent over-tensioning the chain. Current industry pressure relief valves include a fixed pop off, or cracking, pressure based on the design of the hydraulic tensioner sub-components. The range of the pop off pressure is related to tolerance build up of the sub-components during assembly. Currently, in order to reduce cost of the pressure relief valve, low cost manufacturing processes are used which result in increased tolerances and a larger pop off pressure range than desirable. Hydraulic tensioners having pressure relief valves have been previously disclosed in U.S. Pat. No. 8,197,369; U.S. Pat. No. 7,618,339; U.S. Pat. No. 6,810,907; U.S. Pat. No. 5,707,309; U.S. Pat. No. 5,700,213; U.S. Patent Application No. 2013/0017913; U.S. Patent Application No. 2008/0015069; U.S. Patent Application No. 2003/0195070; and U.S. Patent Application No. 2003/0166428.

SUMMARY

A hydraulic tensioner can be used for maintaining tension on an endless loop power transmission member, such as a chain. The hydraulic tensioner can be exposed to forces exerted from interaction with the chain. The external chain forces act on a fluid within a housing of the hydraulic tensioner thereby creating an undesirable increase in fluid pressure. The undesirable increase in fluid pressure can be relieved by a pressure relief valve to prevent over-tensioning of the chain. A driven component can be used to control a pop off pressure value, or relief pressure value, range in an assembled pressure relief valve. The pressure relief valve can include a housing defining a fluid passage and a valve seat, a reciprocal check valve member positioned within the fluid passage for movement toward and away from the valve seat, and a spring normally biasing the reciprocal check valve member toward the valve seat. The pressure relief valve can include a spring retainer assembled within the fluid passage of the housing to a variable depth in response to a feedback control system. The feedback control system can provide a feedback control signal corresponding to a preload force applied to the biasing spring during assembly of the pressure relief valve. The spring retainer can be automatically adjust a biasing force of the assembled spring during assembly to compensate for tolerances effecting a relief pressure value of an assembled pressure relief valve and to allow tighter control of the relief pressure value to be within a predetermined range with respect to a predetermined target relief pressure value for driving the reciprocal check valve member away from the valve seat.

A pressure relief valve can be assembled in a hydraulic tensioner for maintaining tension on an endless loop power transmission member, such as a chain. The hydraulic tensioner can be exposed to forces exerted from interaction with the chain. The external chain forces act on a fluid within a housing of the hydraulic tensioner thereby creating an undesirable increase in fluid pressure. The increased fluid pressure can be relieved by a pressure relief valve to prevent over-tensioning of the chain. The method can include inserting a reciprocal check valve member within a fluid passage defined by a housing for movement toward and away from a valve seat defined by the housing, inserting a spring within the housing to normally bias the reciprocal check valve member toward the valve seat, and driving a spring retainer within the fluid passage of the housing to a variable depth. The spring retainer can be driven in response to a feedback control system for automatically adjusting a biasing force of the assembled spring to compensate for tolerances effecting a relief pressure value of an assembled pressure relief valve and allowing tighter control of the relief pressure value to be within a predetermined range with respect to a predetermined target relief pressure value for allowing movement of the reciprocal check valve member away from the valve seat.

A pressure relief valve can have a housing defining a fluid passage with a valve seat, a reciprocal check valve member engageable with the valve seat, and a biasing spring for urging the reciprocal check valve member normally toward the valve seat. The pressure relief valve can be assembled by a process including positioning the reciprocal check valve member within the fluid passage for movement toward and away from the valve seat, selecting the biasing spring to have characteristics based on a target relief pressure value for allowing movement of the reciprocal check valve member away from the valve seat, inserting the biasing spring in the fluid passage for urging the reciprocal check valve member toward the valve seat, and driving a spring retainer within the fluid passage of the housing to a variable depth in response to a feedback control system for automatically adjusting a biasing force of the assembled spring to compensate for tolerances effecting a relief pressure value of an assembled pressure relief valve and allowing tighter control of the relief pressure value to be within a predetermined range with respect to a predetermined target relief pressure value.

The process of assembling the pressure relief valve can further include testing an assembled pressure relief valve to determine if a measured relief pressure value is within the predetermined range with respect to the predetermined target relief pressure value, accepting the assembled relief pressure valve if the measured relief pressure value is within the predetermined range with respect to the predetermined target relief pressure value, reprocessing the assembled pressure relief valve to drive the spring retainer further inwardly with respect to the housing in an attempt to achieve a measured relief pressure value within the predetermined range with respect to the predetermined target relief pressure value if the measured relief pressure value is below the predetermined range with respect to the target relief pressure value, and rejecting the pressure relief valve if the measured relief pressure value is above the predetermined range with respect to the predetermined target relief pressure value.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
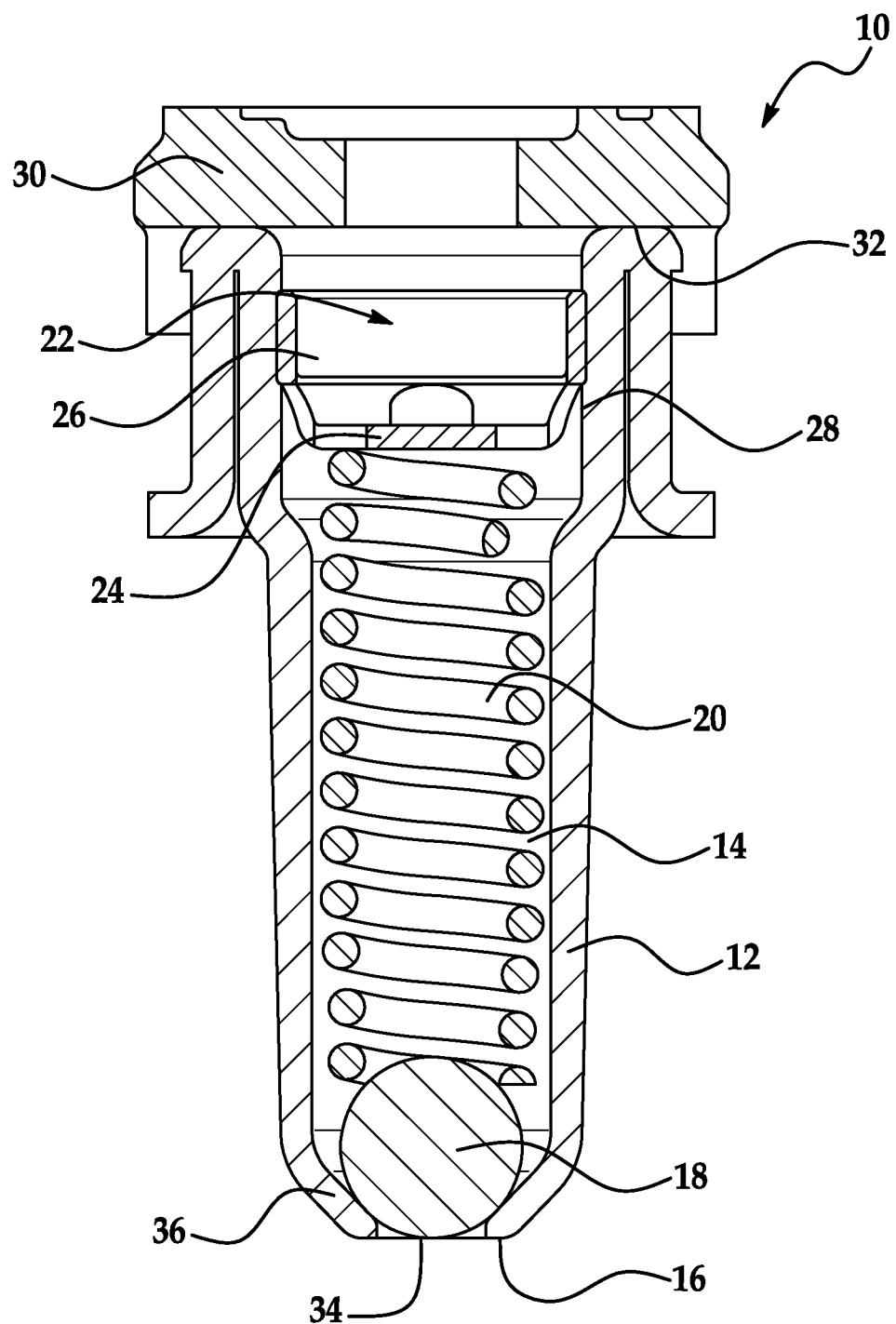
FIG. 1 is a cross sectional view of a pressure relief valve showing a spring retainer press-fit to a variable depth in response to a feedback control system for automatically adjusting a biasing force of an assembled spring to compensate for tolerances effecting a relief pressure value of an assembled pressure relief valve and allowing control of the relief pressure value to be within a predetermined range with respect to a predetermined target relief pressure value for driving a reciprocal check valve member away from a valve seat of the pressure relief valve.
Figure 2A:
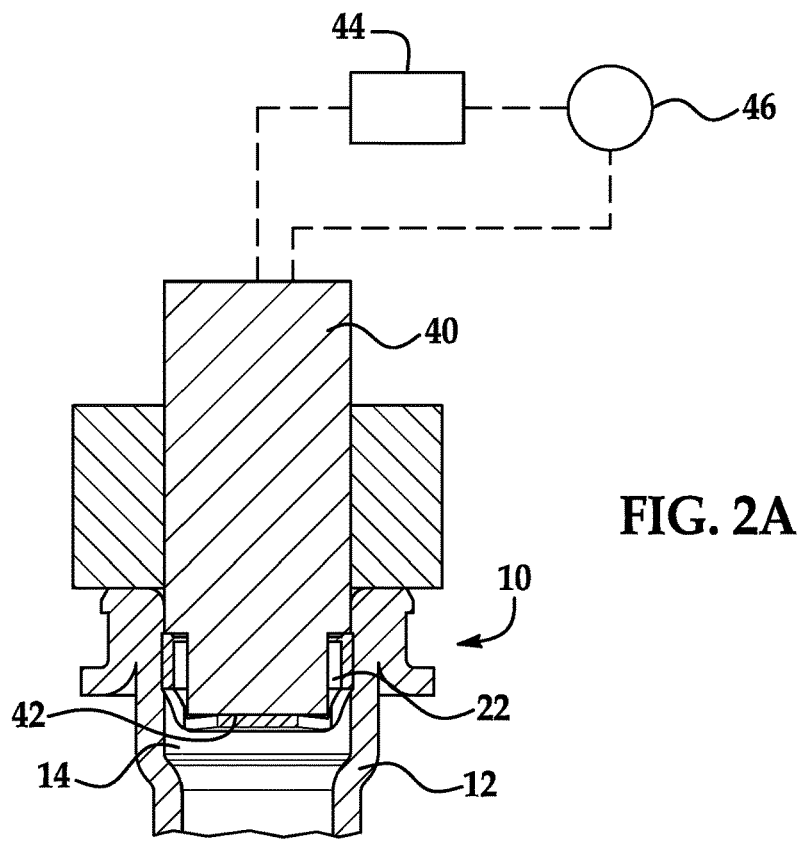
FIG. 2A is a cross sectional view of the pressure relief valve of FIG. 1 showing a variable depth press tool in communication with a feedback control system for driving the spring retainer during assembly.
Figure 2B:
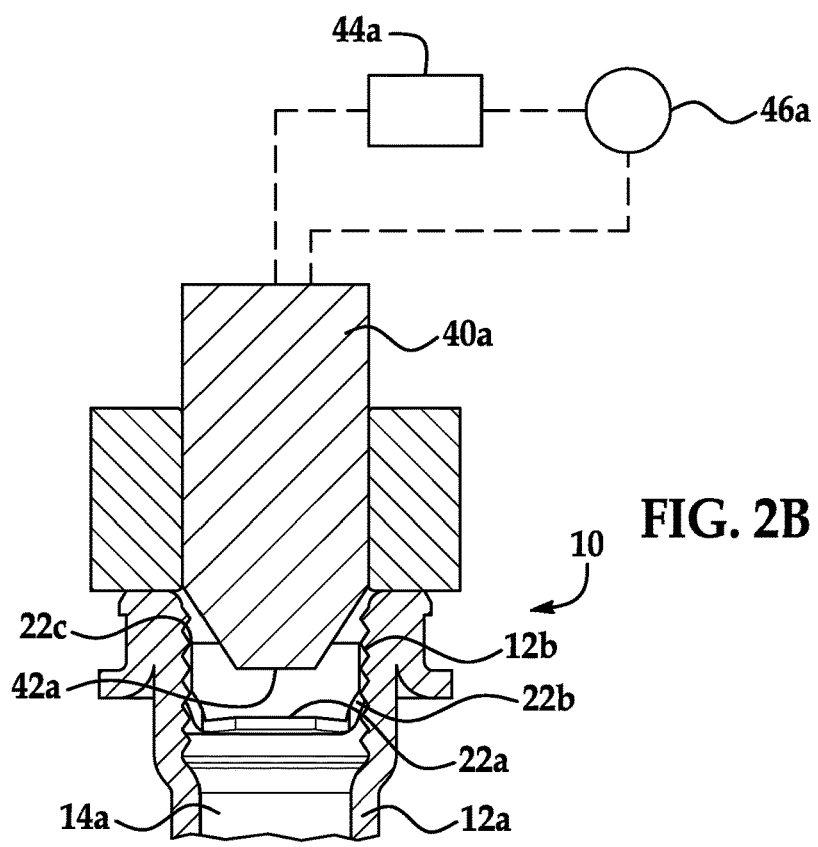
FIG. 2B is a cross sectional view of a pressure relief valve showing the spring retainer having an exterior threaded surface threadedly engageable with a complementary threaded interior surface of the housing and driven to a variable depth by a rotatable driving tool in communication with the feedback control system for driving the spring retainer during assembly.
Figure 3:
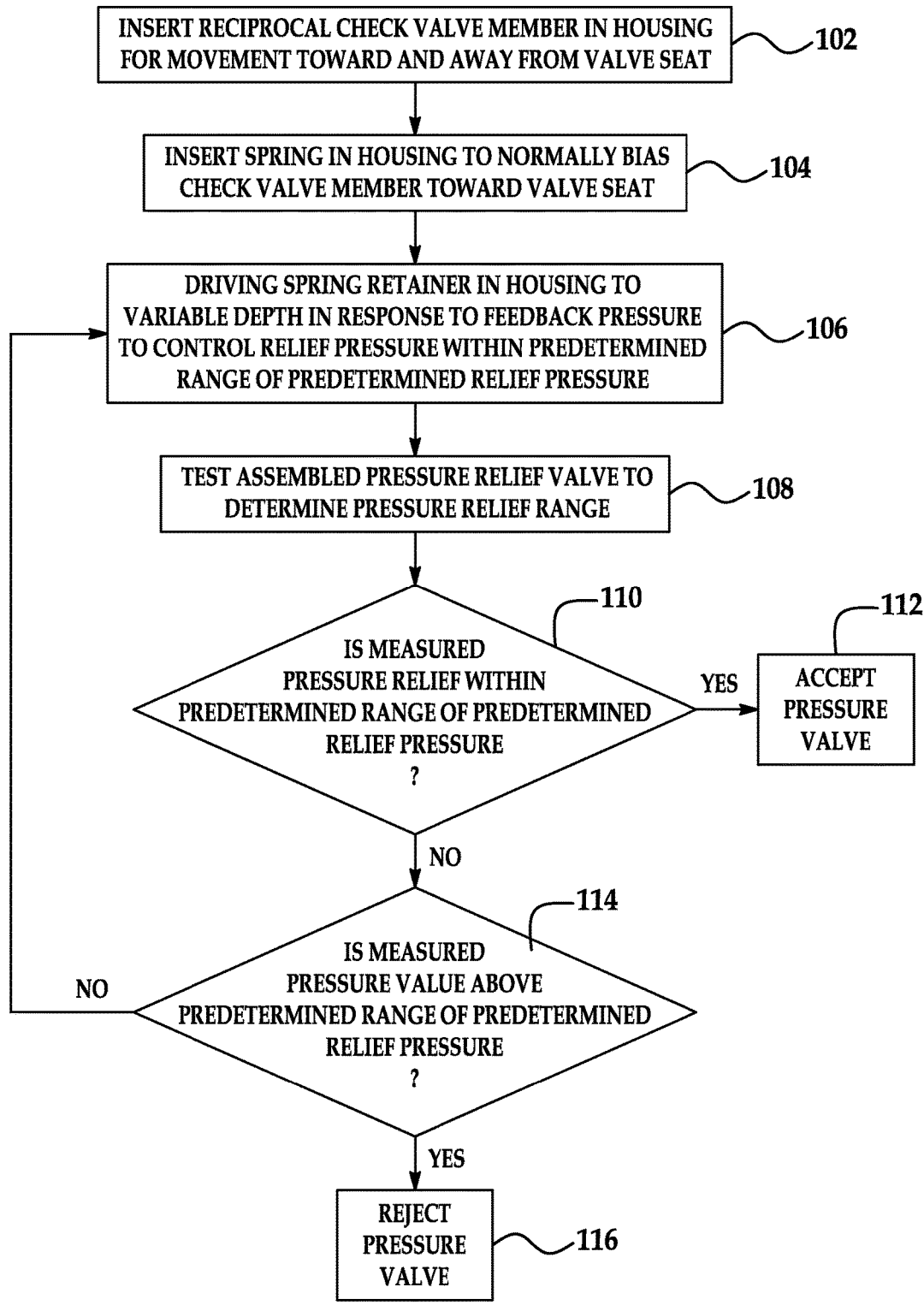
FIG. 3 is a simplified control diagram for assembling the pressure relief valve of FIGS. 2A-2B and for testing the assembled pressure relief valve to determine if a measured pressure relief value is within the predetermined range with respect to the predetermined target relief pressure value, such that the feedback control system can accept the assembled pressure relief valve if the measured value is within the predetermined range, reprocess the assembled pressure relief valve if the measured value is below the predetermined range, and reject the assembled pressure relief valve if the measured value is above the predetermined range.

FIGS. 1-3 show a hydraulic tensioner for an endless loop power transmission member, such as a chain. The hydraulic tensioner is exposed to forces exerted by interaction with the chain. The external forces of the chain act on a fluid within a housing of the hydraulic tensioner and can create undesirable increased fluid pressure. A pressure relief valve 10 can be provided to vent fluid pressure above a predetermined target value to prevent over-tensioning the power transfer member, or chain. As best illustrated in FIG. 1, the pressure relief valve 10 can include a housing 12 defining a fluid passage 14 and a valve seat 16. The valve seat 16 can act as an inlet for pressure relief valve 10 and the fluid passage 14 can selectively be in fluid communication with a high pressure chamber located in the hydraulic tensioner through the inlet. The assembled pressure relief valve 10 can include a reciprocal check valve member 18 positioned within the fluid passage 14 for movement toward and away from the valve seat 16. The reciprocal check valve member 18 can include a ball-shaped check valve member having a surface area 34 exposed to the high pressure chamber located in the hydraulic tensioner. The pressure relief valve 10 can include a spring 20 normally biasing the reciprocal check valve member 18 toward the valve seat 16. The spring 20 can have a force acting on the reciprocal check valve member 18 such that the check valve member 18 is fully seated against the valve seat 16. When pressure in the high pressure chamber exceeds a predetermined limit, the pressure can overcome the force of the spring 20 and drive the check valve member 18 away from the valve seat 16 for pressure relief in the hydraulic tensioner. The pressure relief valve 10 can further include a spring retainer 22 assembled within the fluid passage 14 of the housing 12 to a variable depth.

The spring retainer 22 can be driven to a variable depth in response to a feedback control system in the hydraulic tensioner for automatically adjusting a biasing force of the assembled spring 20 to compensate for tolerances affecting a relief pressure value of an assembled pressure relief valve and allowing for tighter control of the relief pressure value to be within a predetermined range with respect to a predetermined target relief pressure value for driving the reciprocal check valve member 18 away from the valve seat 16. By way of example and not limitation, the predetermined range can be selected from a range of ±5%, ±10%, ±15% or any range therebetween of the predetermined target relief pressure value. By way of example and not limitation, tolerances affecting the relief pressure value can include a length of the housing 12, various spring characteristics (length, spring diameter, wire diameter, material, etc.) of the spring 20, an inlet geometry of the housing 12, and/or a geometry of the valve seat 16. The geometry of the valve seat creates an effective pressure area acting on the reciprocal check valve member 18. The pressure relief valve 10 illustrated in FIGS. 1-3 can accommodate a greater divergence of individual tolerances of individual components by adjusting for a target relief pressure value during assembly of the pressure relief valve 10.

Referring now to FIG. 1, the spring retainer 22 can be press-fit within the fluid passage 14 of the housing 12 and can include a body having an end surface 24 and a cylindrical portion 26 engageable with an inner surface 28 of the housing 12. The cylindrical portion 26 can extend away from the spring 20 and reciprocal check valve member 18 within the fluid passage 14. The spring retainer 22 can include a deeply drawn or stamped cup configuration. By way of example and not limitation, the spring retainer 22 can include a split pin, round plug, or knurled plug. The spring retainer 22 can be hardened to withstand wear created by movement of the spring acting against the spring retainer 22. The press depth of the spring retainer 22 is varied during assembly of the pressure relief valve 10 to adjust the preload spring force. The housing 12 of the pressure relief valve 10 can include a first end 32 and a second end 36. The fluid passage 14 can extend between the first and second end 32, 36. The valve seat 16 and the reciprocal check valve member 18 can be located at the second end 36 in fluid communication with the high pressure chamber located in the hydraulic tensioner. The pressure relief valve 10 can include a valve cap 30 closing the first end 32 of the housing 12 located distally opposite the valve seat 16. The valve cap 30 can enclose the spring retainer 22, the spring 20, and the reciprocal check valve member 18 within the fluid passage 14 of the housing 12. By way of example and not limitation, the cap 30 could include a color or laser barcode to distinguish between pressure relief valves having different pressure ranges with respect to a predetermined target relief pressure value for driving the reciprocal check valve member 18 away from the valve seat 16.

By way of example and not limitation, the spring 20 can have characteristics based on the biasing force to provide the target relief pressure value within the predetermined range for allowing movement of the reciprocal check valve member 18 away from the valve seat 16. The housing 12 can also have an inlet geometry based on the target relief pressure value. The inlet geometry can be varied at the second end 36 of the housing 12.

Referring now to FIGS. 2A, 2B and 3, a pressure relief valve 10 can be assembled into a hydraulic tensioner for an endless loop power transmission member. The endless loop power transmission member can exert forces on a working fluid within the hydraulic tensioner. The external forces can act on the working fluid to undesirably increase fluid pressure. The increased fluid pressure can be relieved by a pressure relief valve when above a predetermined target pressure relief value. The method of assembly can include a step 102 of inserting a reciprocal check valve member 18 within a fluid passage 14 defined by a housing 12 for movement toward and away from a valve seat 16 defined by the housing 12, a step 104 of inserting a spring 20 within the housing 12 to normally bias the reciprocal check valve member 18 toward the valve seat 16, and a step 106 of driving a spring retainer 22 within the fluid passage 14 of the housing 12 to a variable depth in response to feedback control system 44 for automatically adjusting a biasing force of the assembled spring to compensate for tolerances effecting a relief pressure value of an assembled pressure relief valve and allowing tighter control of the relief pressure value to be within a predetermined range with respect to a predetermined target relief pressure value for allowing movement of the reciprocal check valve member 18 away from the valve seat 16. By way of example and not limitation, the predetermined range can be ±5%, ±10%, ±15% or any desired range therebetween with respect to the predetermined target relief pressure value. The step 106 of driving the spring retainer 22 can further include a step of press-fitting the spring retainer 22 within the fluid passage 14 of the housing or threadedly engaging an exterior threaded surface 22b of the spring retainer 22a with a threaded wall 12b formed in the housing 12a.

The method can further include forming the housing 12 defining the fluid passage 14 and the valve seat 16. The housing 12 can be formed to have an inlet geometry based on the predetermined target relief pressure value for allowing movement of the reciprocal check valve member 18 away from the valve seat 16. The method can further include selecting the spring 20 having characteristics based on the predetermined target relief pressure value for allowing movement of the reciprocal check valve member 18 away from the valve seat 16. The length of the spring 20 can be varied with the spring retainer 22 to provide the preload spring force for achieving the predetermined target relief pressure value for allowing movement of the reciprocal check valve member 18 away from the valve seat 16. The method can include step 106 of driving the spring retainer 22 inwardly with respect to the housing 12 and interposing the reciprocal check valve member 18 and spring 20 in between the valve seat 16 of the housing 12 and the spring retainer 22. The method can further include halting insertion movement of the spring retainer 22 in response to a feedback signal from a feedback control system 44 correlated with a spring resistance force for automatically adjusting a biasing force of the assembled spring 20 to compensate for tolerances effecting a relief pressure value of an assembled pressure relief valve and allowing control of the relief pressure value to be within a predetermined range, by way of example and not limitation, such as a range of ±10%, with respect to the predetermined target relief pressure value.

Referring now to FIGS. 2A-2B, the pressure relief valve 10 can have a spring retainer 22 driven to a variable depth allowing for reduced cost components and greater variance tolerances of component while providing for tighter tolerance of pop off or relief pressure values. In addition, the pressure relief valve 10 can provide for a range of predetermined relief pressure values using the same housing, valve member, spring retainer and cap, while using springs with different operating characteristics selected based on the pop off or target relief pressure. As illustrated in FIG. 2A, the spring retainer 22 can be press-fit to a variable depth depending on the tolerances of the components being assembled. By way of example and not limitation, when the spring retainer 22 is press fit flush with respect to the first end 32 of the housing 12 of the pressure relief valve 10, the pressure relief valve 10 can be adjusting for a maximum spring force, a minimum length of the housing 12, and a minimum effective pressure surface area 34, and when the spring retainer 22 is press fit to a maximum depth with respect to the first end 32 of the housing 12, the pressure relief valve 10 can be adjusting for a minimum spring force, a maximum length of the housing 12, and a maximum effective pressure surface area 34. During assembly, the spring retainer 22 can be press fit into the housing 12 using a variable depth press tool 40 having a contoured tip 42 to a depth range of approximately 0.4 millimeters (mm) to approximately 2.0 millimeters (mm), inclusive. By way of example and not limitation, the spring retainer 22 can be pressed to varying depths in increments of approximately 0.1 millimeter (mm). It can be desirable to drive the spring retainer 22 to a nominal depth to allow for greater tolerances during assembly. A feedback control system 44 can control the press fit of the spring retainer 22 with a variable depth press tool 40 within the housing 12. By way of example and not limitation, the variable depth press tool can include a hydraulic, pneumatic, or electric servo driven press. The feedback control system 44 can further include a sensor 46, by way of example and not limitation, such as a pressure sensor or a current sensor, for measuring a predetermined parameter associated with the preload spring resistance force during assembly of the pressure relief valve 10 and can provide feedback to the feedback control system 44 to determine when the insertion of the variable depth press tool 40 can be stopped, i.e. when the target preload spring resistance force has been achieved. The feedback control system 44 can include a pressure sensor or a current sensor. By way of example and not limitation, the sensor 46 can measure pressure for a feedback control system 44 controlling a hydraulic or pneumatic press tool, and the sensor 46 can measure current for a feedback control system 44 controlling an electric servo driven press tool.

As illustrated in FIG. 2B, the spring retainer 22a can include an exterior threaded surface 22b matingly engageable with an interior threaded wall 12b formed in the housing 12a. The housing 12a can define a fluid passage 14a for receiving the spring retainer 22a. The spring retainer 22a can include a tool receiving aperture 22c. During assembly, the spring retainer 22a can be driven into the housing 12 using a rotatable driving tool 40a having a tip 42a complementary in shape to the tool receiving aperture 22c of the spring retainer 22a. The driving of the spring retainer 22a with the rotatable driving tool 40a within the housing 12a can incorporate the above description of the feedback control system 44a having a sensor 46a to determine when the driving of the spring retainer 22a can be stopped, i.e. when the target preload spring resistance force has been achieved.

As best illustrated in FIG. 3, the method can also include a step 108 of testing an assembled pressure relief valve 10 for measuring the relief pressure of the assembled pressure relief valve 10 during fluid flow and a step 110 of determining if a measured pressure relief value is within the predetermined range with respect to the predetermined target relief pressure value. The method can include a step 112 of accepting the assembled pressure relief valve if the measured relief pressure if the measured relief pressure value is within the predetermined range with respect to the predetermined target relief pressure value, a query step 114 provides a return branch to driving step 106 for reprocessing the assembled pressure relief valve to drive the spring retainer 22 further inwardly with respect to the housing 12 in an attempt to achieve a measured relief pressure value within the predetermined range with respect to the predetermined target relief pressure value if the measured relief pressure value is below the predetermined range with respect to the predetermined target relief pressure value, and a step 116 of rejecting the assembled pressure relief valve if the measured relief pressure value is above the predetermined range with respect to the predetermined target relief pressure value. The feedback control system 44 can communicate with the variable depth press tool 40 or rotatable driving tool 40a to control reprocessing the assembled pressure relief valve by driving the spring retainer 22, 22a further inwardly with respect to the housing 12, 12a.

The method can include forming the spring retainer 22 having an end surface 24 engageable with the spring 20 and a cylindrical portion 26 engageable with an inner surface 28 of the housing 12 during insertion of the spring retainer 22 within the housing 12. The housing 12 can include a first end 32 and a second end 36. The valve seat 16 and the reciprocal check valve member 18 can be located at the second end 36. The method can include enclosing the spring retainer 22, the spring 20, and the reciprocal check valve member 18 in the housing 12 with a valve cap 30 located at the first end 32 of the housing 12 distally opposite from the valve seat 16.

A pressure relief valve 10 can have a housing 12 defining a fluid passage 14 with a valve seat 16, a reciprocal check valve member 18 engageable with the valve seat 16, and a biasing spring 20 for urging the reciprocal check valve member 18 normally toward the valve seat 16. The pressure relief valve 10 can be assembled by a process including positioning the reciprocal check valve member 18 within the fluid passage 14 for movement toward and away from the valve seat 16, selecting the biasing spring 20 to have characteristics based on a target relief pressure value for allowing movement of the reciprocal check valve member 18 away from the valve seat 16, inserting the biasing spring 20 in the fluid passage 14 for urging the reciprocal check valve member 18 toward the valve seat 16, and driving a spring retainer 22 within the fluid passage 14 of the housing 12 to a variable depth in response to feedback pressure for automatically adjusting a biasing force of the assembled spring 20 to compensate for tolerances effecting a relief pressure value of an assembled pressure relief valve 10 and allowing control of the relief pressure value to be within a predetermined range of a predetermined target relief pressure value. The process can include testing the assembled pressure relief valve 10 to determine if a measured relief pressure value is within the predetermined range with respect to the predetermined target relief pressure value, accepting the assembled pressure relief valve 10 if the measured relief pressure value is within the predetermined range with respect to the predetermined target relief pressure value, reprocessing the assembled pressure relief valve 10 to drive the spring retainer 22 further inwardly with respect to the housing 12 in an attempt to achieve a measured relief pressure value within the predetermined relief pressure with respect to the predetermined target relief pressure value if the measured relief pressure value is below the predetermined range with respect to the target relief pressure value, and rejecting the pressure relief valve 10 if the measured relief pressure value is above the predetermined range with respect to the predetermined target relief pressure value.

Figure 4:
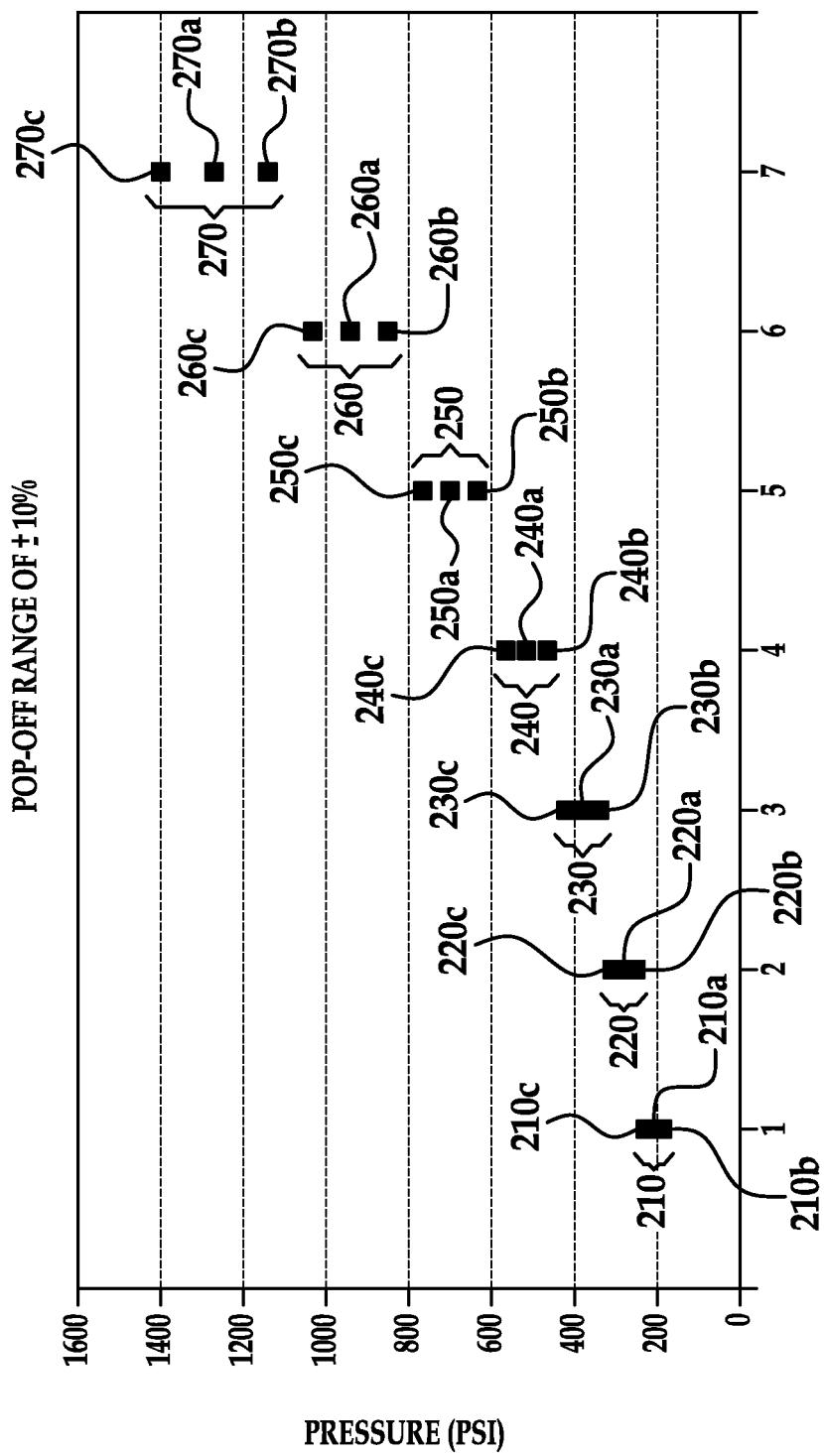
FIG. 4 is a graph showing seven target relief pressure value ranges for driving a reciprocal check valve member away from a valve seat of the pressure relief valve, each of the pressure value ranges having a low pressure value within −10% of a nominal target pressure value and a high pressure value within +10% of the nominal target pressure value, where the pressure relief valve can be assembled using a common housing, reciprocal valve member and spring retainer, while using different springs selected for the particular target pressure range and assembled as shown in FIGS. 1-3.

Referring now to FIG. 4, the graph illustrates seven separate relief pressure value ranges 210, 220, 230, 240, 250, 260, 270 on an X-axis for seven different relief pressure valve assemblies that can be implemented in a pressure relief valve 10 as described with respect to FIGS. 1-3 above. Each of the relief pressure ranges 210, 220, 230, 240, 250, 260, 270 can include values within ±5%, ±10%, ±15% or any desired range therebetween of a nominal target relief pressure value 210a, 220a, 230a, 240a, 250a, 260a, 270a for driving the reciprocal check valve member 18 away from the valve seat 16, or "pop-off range", graphed on the Y-axis. By way of example and not limitation, an assembled pressure relief valve 10 can have a range of low or high predetermined relief pressure values 210b, 210c; 220b, 220c; 230b, 230c; 240b, 240c; 250b, 250c; 260b, 260c; 270b, 270c. Each relief pressure value range 210, 220, 230, 240, 250, 260, 270 includes a target pressure value, a low pressure value, and high pressure value 210a, 210b, 210c; 220a, 220b, 220c; 230a, 230b, 230c; 240a, 240b, 240c; 250a, 250b, 250c; 260a, 260b, 260c; 270a, 270b, 270c. By way of example and not limitation, the low and high pressure values can be within ±10% of a predetermined nominal or target relief pressure value 210a, 220a, 230a, 240a, 250a, 260a, 270a desired for driving the reciprocal check valve member 18 away from the valve seat 16, such that a low pressure value 210b, 220b, 230b, 240b, 250b, 260b, 270b is within −10% of the corresponding target pressure value 210a, 220a, 230a, 240a, 250a, 260a, 270a and a high pressure value 210c, 220c, 230c, 240c, 250c, 260c, 270c is within +10% of the corresponding target pressure value 210a, 220a, 230a, 240a, 250a, 260a, 270a. By way of example and not limitation, the lowest relief pressure valve corresponding to range 210 of the target relief pressure value range is between approximately 186.3 to approximately 227.7 pounds per square inch (psi), inclusive, and the highest relief pressure valve corresponding to range 270 is between approximately 1139.4 to approximately 1392.6 pounds per square inch (psi), inclusive. By way of example and not limitation, as illustrated in FIG. 4, the relief pressure value ranges 210, 220, 230, 240,

250, 260, 270 can be separated by approximately ±15% pressure values in the various exemplary valves illustrated. Differing desired pressure value ranges can allow for greater hydraulic tensioner tunability for a more efficient timing drive system.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a hydraulic tensioner for an endless loop power transmission member including a pressure relief valve (10) to prevent over-tensioning of the endless loop power transmission member, the improvement of the pressure relief valve (10) comprising:
   a housing (12) defining a fluid passage (14) and a valve seat (16);
   a reciprocal check valve member (18) positioned within the fluid passage (14) for movement toward and away from the valve seat (16);
   a spring (20) normally biasing the reciprocal check valve member (18) toward the valve seat (16); and
   a spring retainer (22) assembled within the fluid passage (14) of the housing (12) to a variable depth in response to a feedback control system (44) for automatically adjusting a biasing force of the assembled spring (20) to compensate for tolerances effecting a relief pressure value of an assembled pressure relief valve (10) and allowing control of the relief pressure value to be within a predetermined range with respect to a predetermined target relief pressure value for driving the reciprocal check valve member (18) away from the valve seat (16).

2. The improvement of claim 1, wherein the spring (20) has characteristics based on the biasing force to provide the target relief pressure value within the predetermined range for allowing movement of the reciprocal check valve member (18) away from the valve seat (16).

3. The improvement of claim 1, wherein the housing (12) has an inlet geometry based on the target relief pressure value for allowing movement of the reciprocal check valve member (18) away from the valve seat (16).

4. The improvement of claim 1, wherein the feedback control system (44, 44a) includes at least one of a pressure sensor and a current sensor.

5. The improvement of claim 1, wherein the spring retainer (22) is press-fit within the fluid passage (14) of the housing (12).

6. The improvement of claim 1, wherein the spring retainer (22a) includes an exterior threaded surface (22b) matingly engageable with an interior threaded wall (12b) formed in the housing (12a).

7. The improvement of claim 1, wherein the predetermined range is ±10% of the predetermined target relief pressure value.

8. A method of assembling a pressure relief valve (10) for a hydraulic tensioner of an endless loop power transmission member, the method comprising:
   inserting a reciprocal check valve member (18) within a fluid passage (14) defined by a housing (12) for movement toward and away from a valve seat (16) defined by the housing (12);
   inserting a spring (20) within the housing (12) to normally bias the reciprocal check valve member (18) toward the valve seat (16); and
   driving a spring retainer (22) within the fluid passage (14) of the housing (12) to a variable depth in response to a feedback control system (44) for automatically adjusting a biasing force of the assembled spring (20) to compensate for tolerances effecting a relief pressure value of an assembled pressure relief valve (10) and allowing control of the relief pressure value to be within a predetermined range with respect to a predetermined target relief pressure value for allowing movement of the reciprocal check valve member (18) away from the valve seat (16).

9. The method of claim 8, wherein driving the spring retainer (22) further comprises:
   press-fitting the spring retainer (22) within the fluid passage (14) of the housing (12).

10. The method of claim 8, wherein driving the spring retainer (22) further comprises:
    threadedly engaging an exterior threaded surface (22b) of the spring retainer (22a) with an interior threaded wall (12b) formed in the housing (12a).

11. The method of claim 8, further comprising:
    forming the housing (12) to have an inlet geometry based on a predetermined target pressure relief value for allowing movement of the reciprocal check valve member (18) away from the valve seat (16).

12. The method of claim 8, further comprising:
    selecting the spring (20) having characteristics based on the predetermined target relief pressure value for allowing movement of the reciprocal check valve member (18) away from the valve seat (16).

13. The method of claim 8, further comprising:
    testing an assembled pressure relief valve (10) to determine if a measured relief pressure value is within the predetermined range with respect to the predetermined target relief pressure value;
    if the measured relief pressure value is within the predetermined range with respect to the predetermined target relief pressure value, accepting the assembled pressure relief valve (10);
    if the measured relief pressure value is below the predetermined range with respect to the predetermined target relief pressure value, reprocessing the assembled pressure relief valve (10) to drive the spring retainer (22) further inwardly with respect to the housing (12) in an attempt to achieve a measured relief pressure value within the predetermined range with respect to the predetermined target relief pressure value; and
    if the measured relief pressure value is above the predetermined range with respect to the predetermined target relief pressure value, rejecting the assembled pressure relief valve (10).

14. The method of claim 8, further comprising:
    enclosing the spring retainer (22), the spring (20), and the reciprocal check valve member (18) in the housing (12) with a valve cap (30) located at an end (32) of the housing (12) distally opposite from the valve seat (16).

15. A pressure relief valve (10) having a housing (12) defining a fluid passage (14) with a valve seat (16), a reciprocal check valve member (18) engageable with the valve seat (16), a biasing spring (20) for urging the reciprocal check valve member (18) normally toward the valve seat (16), the pressure relief valve (10) assembled by a process comprising:

positioning the reciprocal check valve member (18) within the fluid passage (14) for movement toward and away from the valve seat (16);

selecting the biasing spring (20) to have characteristics based on a target relief pressure value for allowing movement of the reciprocal check valve member (18) away from the valve seat (16);

inserting the biasing spring (20) in the fluid passage (14) for urging the reciprocal check valve member (18) toward the valve seat (16);

driving a spring retainer (22) within the fluid passage (14) of the housing (12) to a variable depth in response to a feedback control system (44) for automatically adjusting a biasing force of the assembled spring (20) to compensate for tolerances effecting a relief pressure value of an assembled pressure relief valve (10) and allowing control of the relief pressure value to be within a predetermined range with respect to a predetermined target relief pressure value;

testing an assembled pressure relief valve (10) to determine if a measured relief pressure value is within the predetermined range with respect to the predetermined target relief pressure value;

if the measured relief pressure value is within the predetermined range with respect to the predetermined target relief pressure value, accepting the assembled pressure relief valve (10);

if the measured relief pressure value is below the predetermined range with respect to the target relief pressure value, reprocessing the assembled pressure relief valve (10) to drive the spring retainer (22) further inwardly with respect to the housing (12) in an attempt to achieve a measured relief pressure value within the predetermined range with respect to the predetermined target relief pressure value; and if the measured relief pressure value is above the range of the predetermined range with respect to the predetermined target relief pressure value, rejecting the pressure relief valve (10).

\* \* \* \* \*